United States Patent
Barzic et al.

(10) Patent No.: US 11,698,995 B2
(45) Date of Patent: Jul. 11, 2023

(54) PERIPHERAL ACCESS ON A SECURE-AWARE BUS SYSTEM

(71) Applicant: Nordic Semiconductor ASA, Trondheim (NO)

(72) Inventors: Ronan Barzic, Trondheim (NO); Berend Dekens, Trondheim (NO); Frank Aune, Trondheim (NO); Anders Nore, Trondheim (NO)

(73) Assignee: Nordic Semiconductor ASA, Trondheim (NO)

(*) Notice: Subject to any disclaimer, the term of this patent is extended or adjusted under 35 U.S.C. 154(b) by 119 days.

(21) Appl. No.: 17/255,876

(22) PCT Filed: Jun. 26, 2019

(86) PCT No.: PCT/EP2019/067010
§ 371 (c)(1),
(2) Date: Dec. 23, 2020

(87) PCT Pub. No.: WO2020/002432
PCT Pub. Date: Jan. 2, 2020

(65) Prior Publication Data
US 2021/0264066 A1    Aug. 26, 2021

(30) Foreign Application Priority Data
Jun. 28, 2018 (GB) .................... 1810662

(51) Int. Cl.
*G06F 21/85* (2013.01)
*G06F 21/54* (2013.01)
(Continued)

(52) U.S. Cl.
CPC .............. *G06F 21/85* (2013.01); *G06F 21/54* (2013.01); *G06F 21/567* (2013.01); *G06F 21/602* (2013.01); *G06F 21/64* (2013.01)

(58) Field of Classification Search
CPC ........ G06F 21/85; G06F 21/54; G06F 21/567; G06F 21/602; G06F 21/64; H04L 63/02
See application file for complete search history.

(56) References Cited

U.S. PATENT DOCUMENTS 5,579,531 A    11/1996  Sugita
7,650,645 B1    1/2010  Langendorf et al.
(Continued)

FOREIGN PATENT DOCUMENTS

CN    105631364 A    6/2016
CN    105825128 A    8/2016
(Continued)

OTHER PUBLICATIONS

Murray, John M., "Microcomputer Peripherals," IEEE Transactions on Industrial Electronics and Control Instrumentation, vol. IECI-25, No. 4, Nov. 1978, pp. 303-322.
(Continued)

*Primary Examiner* — Trong H Nguyen
(74) *Attorney, Agent, or Firm* — Klarquist Sparkman, LLP

(57) ABSTRACT

An integrated-circuit device comprises a processor, a peripheral component, a bus system, connected to the processor and to the peripheral component, and configured to carry bus transactions; and hardware filter logic. The bus system is configured to carry security-state signals for distinguishing between secure and non-secure bus transactions. The peripheral component comprises a register interface, accessible over the bus system, and comprising a hardware register and a direct-memory-access (DMA) controller for initiating bus transactions on the bus system. The peripheral component supports a secure-in-and-non-secure-out state in which the hardware filter logic is configured to prevent non-secure bus transactions from accessing the hardware register of the peripheral component, but to allow secure bus transactions (Continued)

to access the peripheral component. The peripheral component is configured to allow an incoming secure bus transaction to access the hardware register and to initiate a bus transaction as non-secure.

14 Claims, 6 Drawing Sheets

(51) Int. Cl.
    *G06F 21/56*     (2013.01)
    *G06F 21/60*     (2013.01)
    *G06F 21/64*     (2013.01)

(56) References Cited

U.S. PATENT DOCUMENTS

| | | | |
|---|---|---|---|
| 8,719,925 | B1 | 5/2014 | Berg |
| 10,140,227 | B1* | 11/2018 | Machulsky ......... G06F 13/4221 |
| 2003/0200451 | A1 | 10/2003 | Evans et al. |
| 2003/0226029 | A1* | 12/2003 | Porter .................. G06F 21/10 |
| | | | 348/E7.056 |
| 2004/0143714 | A1 | 7/2004 | Watt |
| 2004/0221173 | A1* | 11/2004 | Moyer .................. G06F 21/85 |
| | | | 713/189 |
| 2004/0250063 | A1 | 12/2004 | Gulick et al. |
| 2005/0033969 | A1 | 2/2005 | Kiiveri et al. |
| 2005/0114616 | A1 | 5/2005 | Tune et al. |
| 2006/0090084 | A1 | 4/2006 | Buer |
| 2008/0052534 | A1* | 2/2008 | Harada .................. G06F 21/79 |
| | | | 711/E12.091 |
| 2009/0292901 | A1 | 11/2009 | Henry et al. |
| 2010/0186080 | A1 | 7/2010 | Thanner et al. |
| 2011/0225651 | A1 | 9/2011 | Villasenor et al. |
| 2012/0036347 | A1 | 2/2012 | Swanson et al. |
| 2012/0047576 | A1 | 2/2012 | Do et al. |
| 2012/0110659 | A1 | 5/2012 | Brokish et al. |
| 2013/0031290 | A1* | 1/2013 | Schwartz ............... G06F 21/85 |
| | | | 710/316 |
| 2013/0031374 | A1 | 1/2013 | Thom et al. |
| 2013/0047250 | A1 | 2/2013 | Kothari |
| 2014/0188732 | A1 | 7/2014 | Kobres |
| 2014/0282819 | A1 | 9/2014 | Sastry et al. |
| 2014/0304439 | A1 | 10/2014 | Elahi et al. |
| 2014/0366131 | A1 | 12/2014 | Lai |
| 2015/0378944 | A1 | 12/2015 | Robertson et al. |
| 2016/0004647 | A1 | 1/2016 | Eppensteiner et al. |
| 2016/0004656 | A1* | 1/2016 | Arbel .................... G06F 21/78 |
| | | | 710/110 |
| 2016/0267038 | A1 | 9/2016 | Elahi et al. |
| 2016/0321472 | A1* | 11/2016 | Pedersen ............... G06F 21/85 |
| 2016/0357991 | A1 | 12/2016 | Hershman et al. |
| 2017/0060637 | A1 | 3/2017 | Persson et al. |
| 2017/0139851 | A1 | 5/2017 | Pean et al. |
| 2018/0060077 | A1 | 3/2018 | Abdulhamid et al. |
| 2018/0136967 | A1 | 5/2018 | Asbe et al. |
| 2018/0144145 | A1 | 5/2018 | Pearson |
| 2018/0239727 | A1 | 8/2018 | Hershman et al. |

FOREIGN PATENT DOCUMENTS

| | | |
|---|---|---|
| CN | 105683981 B | 10/2018 |
| DE | 102013101508 A1 | 8/2013 |
| EP | 2 725 517 A1 | 4/2014 |
| GB | 2 396713 A | 6/2004 |
| GB | 2 396 930 A | 7/2004 |
| GB | 2 497 528 A | 6/2013 |
| GB | 2 501 470 A | 10/2013 |
| GB | 2 531 844 A | 5/2016 |
| GB | 2 539 455 A | 12/2016 |
| WO | WO 2013/088121 A1 | 6/2013 |
| WO | WO 2016/203193 A1 | 12/2016 |

OTHER PUBLICATIONS

U.S. Appl. No. 17/048,937, filed Oct. 19, 2020, Talvitie et al.
U.S. Appl. No. 17/255,872, filed Dec. 23, 2020, Winblad et al.
U.S. Appl. No. 17/255,921, filed Dec. 23, 2020, Dekens.
ARM1176JZ-S, Revision: r0p7, Technical Reference Manual, Table of Contents, List of Tables, List of Figures, Preface, Figure 2-2, Nov. 27, 2009, 24 pages.
ARM AMBA Arbiter Data Sheet, Chapter 1, Copyright © 1995-1997 ARM Limited, 10 pages.
ARM AMBA 5 AHB Protocol Specification AHB5, AHB-Lite, Copyright © 2001, 2006, 2010, 2015 ARM Limited or its affiliates, 86 pages.
ARM AMBA 3 AHB-Lite Protocol v1.0 Specification, Copyright © 2001, 2006 ARM Limited, 72 pages.
ARM CoreLink STF-2000 System IP for Embedded, Revision: R2p0, Technical Reference Manual, Copyright © 2016 ARM Limited or its affiliates, 155 pages.
Arm® CoreLink™ SSE-200 Subsystem for Embedded, Revision: r1p0, Technical Reference Manual, Copyright © 2016, 2017 Arm Limited (or its affiliates), 178 pages.
ARM Cortex-M33 Processor Technical Reference Manual, B3.1 About Security Attribution and Memory Protection, http://infocenter.arm.com/help/topic/com.arm.doc.100230_0002_00_en/jfa1433859029571.html, downloaded Jun. 14, 2018, 2 pages.
ARM Security Technology, 2009, Building a Secure System using TrustZone (RTM) technology, arm.com, [online], available from: http://infocenter.arm.com/help/topic/com.arm.doc.prd29-genc-009492c/PRD29-GENC-009492C_trustzone_security_whitepaper.pdf, [Accessed Oct. 16, 2018].
ARM—TrustZone technology for the ARMv8-M architecture, Copyright © 2017 ARM Limited or its affiliates, 28 pages.
Cyclone v Hard Processor System Technical Reference Manual, Altera, Cover Page, Table of Contents, Chapter 7, pp. 16, 36-60 and Chapter 11, p. 23, Oct. 28, 2016.
International Search Report and Written Opinion for PCT/EP2019/060004, dated Jul. 17, 2019, 12 pages.
IPO Search Report under Section 17(5) for GB 1806465.9, dated Oct. 18, 2018, 6 pages.
New AMBA Specification Extends Security to Embedded Design: AMBA 5 AHB5, https://community.arm.com/processors/b/blog/posts/new-amba-specification-extends- . . . , downloaded Apr. 25, 2018, 6 pages.
Payne, "How to Implement a Secure IoT system on ARMv8-M," Published on Apr. 14, 2017, 3 pages.
TrustZone—Arm Developer, arm TrustZone, Introducing Arm TrustZone, https://developer.arm.com/technologies/trustzone, downloaded Apr. 25, 2018, 11 pages.
Yee, Carnegie Mellon University, 1994, "Using Secure Coprocessors", Bennet Yee, citeseerx.ist.psu.edu. [online]. Available from: http://citeseerx.ist.pdu.edu/viewdoc/download?doi=10.1.1.28.4872&rep=rep1&type=pdf, [Accessed Oct. 16, 2018].
Abdelnour et al., Peripheral Component Interconnect-Lite Bus Interface Design, TDB, v40 n7 Jul. 1997, Jul. 1, 1997, p. 55-56. (Year: 1997).
Chipcraft, CC-UART-AXI UART Serial Interface Controller, 2017, Chip Craft, 3 pages (Year: 2017).
IP.com, "Method and System for Passing Messages in a PCIe Environment," IPCQM000237920D, Jul. 21, 2014, pp. 1-6. (Year: 2014).
Merkin et al., "Method to Bound Peripheral Component Interconnect System Configurations," TDB, v37 n10 Oct. 1994, Oct. 1, 1994, pp. 455-456. (Year: 1997).
Pannuto et al., "MBus: A System Integration Bus for the Modual Microscale Computing Class," in IEEE Micro, vol. 36, No. 3, pp. 60-70, May-Jun. 2016, doi: 10.1109/MM2016.41. (Year: 2016).

* cited by examiner

PERIPHERAL ACCESS ON A SECURE-AWARE BUS SYSTEM

CROSS REFERENCE TO RELATED APPLICATIONS

This is the U.S. National Stage of International Application No. PCT/EP/2019/067010, filed Jun. 26, 2019, which was published in English under PCT Article 21(2), which in turn claims the benefit of Great Britain Application No. 1810662.5, filed Jun. 28, 2018.

BACKGROUND OF THE INVENTION

This invention relates to integrated-circuit devices that have bus systems supporting secure and non-secure bus transactions, and methods of operating the same.

Integrated-circuit processing devices, such as system-on-chip (SoC) and radio-on-a-chip devices, commonly use a bus system, such as an Arm™ AMBA (Advanced Microcontroller Bus Architecture) bus system, to provide communication between a processor, memory, and peripherals, that all are integrated on the device.

The memory of such a device may contain sensitive information, such as data or software code, to which access should be restricted. Similarly, some peripherals, such as cryptographic accelerators, may handle sensitive data, or provide other sensitive functions. It can therefore be desirable to limit access to certain memory regions and to certain peripherals only to "trusted" software code, such as code developed by the device manufacturer, and to block access by other code, such as application code developed by a third party.

Restricting access to certain regions of memory, or to certain peripherals, through software measures alone is not particularly secure, and can be vulnerable both to hacking and to software bugs. Hardware mechanisms are generally considered to be more secure.

Arm™ TrustZone provides compatible Arm™ microcontrollers (e.g., a Cortex™-M33) with two operating states: "Secure" and "Non-Secure".

Arm™'s Advanced High-Performance Bus (AHB) specification "AHB 5" is an open interface protocol for embedded SoCs. It defines an additional signal, HNONSEC, on the bus system that can be asserted by a compatible Arm™ TrustZone processor, during the address phase of a bus transfer, to distinguish between a "Secure" bus transfer and a "Non-secure" bus transfer.

The product designer can designate certain regions of memory and/or certain peripherals (e.g., a cryptoprocessor), as being "secure-world" resources, while other regions of memory and peripherals are not so designated. A peripheral may be permanently "secure" or "non-secure", or its status can be configured by software through a Peripheral Protection Control (PPC) register. Hardware logic in the bus fabric ensures that no "secure-world" resources can be accessed directly by "non-secure-world" software, thereby providing a security perimeter around sensitive resources. Bus infrastructure components can support partitioning of memory spaces in memory components, to block non-secure accesses to secure memories.

Secure transactions can only be generated by secure software or, in cases of testing, an authorised debugger. Non-secure (non-trusted) software applications cannot access secure (trusted) resources directly, but must request access through APIs (application programming interfaces) provided by secure software. These APIs can implement authentication checks to decide whether to permit access to a secure service. This approach makes it harder for attackers, who may have compromised part of the non-secure software code, to access sensitive information stored on such a device, or for software bugs to inadvertently gain access to secure resources.

In known architectures, filtering is performed at the Arm™ TrustZone processor itself, e.g., using a "Secure Attribution Unit" (SAU) and an "Implementation Defined Attribution Unit" (IDAU). In some systems, additional filtering may be provided by filter units that are located at the edges of the bus infrastructure, between the bus and a peripheral or memory; these filter units can intercept bus transactions and block unauthorised bus requests before they reach the peripheral or memory.

The use of security states can thus provide increased security for an integrated-circuit device. However, existing approaches can lead to inefficient designs in some situations. For example, the applicant has recognised that it can sometimes be necessary to provide two instances of the same peripheral—a secure instance and a non-secure instance—in order to provide an integrated-circuit device with maximum functionality while maintaining the security of the device. This is undesirable as it increases the complexity and cost of the integrated-circuit device.

The present invention seeks to provide an alternative approach to securing access to peripherals on integrated-circuit devices.

SUMMARY OF THE INVENTION

From a first aspect, the invention provides an integrated-circuit device comprising:
a processor;
a peripheral component; and
a bus system, connected to the processor and to the peripheral component, and configured to carry bus transactions,
wherein:
the peripheral component comprises a register interface, accessible over the bus system, the register interface comprising a first hardware register and a second hardware register;
the bus system is configured to carry security-state signals for distinguishing between secure bus transactions and non-secure bus transactions;
the peripheral component comprises an input for receiving security-state signals from the bus system; and
the peripheral component supports a split-security state in which the peripheral component is configured to:
prevent a non-secure bus transaction from accessing the first hardware register;
allow a secure bus transaction to access the first hardware register; and
allow a non-secure bus transaction to access the second hardware register.

From a second aspect, the invention provides a method of operating an integrated-circuit device, wherein the integrated-circuit device comprises:
a processor;
a peripheral component; and
a bus system, connected to the processor and to the peripheral component, and configured to carry secure bus transactions and non-secure bus transactions,
wherein the peripheral component comprises a register interface, accessible over the bus system, the register interface comprising a first hardware register and a second hardware register, the method comprising:

the peripheral component receiving secure bus transactions and non-secure bus transactions from the bus system; and the peripheral component being in a split-security state and, while in the split-security state:

preventing a non-secure bus transaction from accessing the first hardware register;

allowing a secure bus transaction to access the first hardware register; and allowing a non-secure bus transaction to access the second hardware register.

Thus it will be seen that, in accordance with these aspects of the invention, a peripheral can be in a split-security state, which is neither a "secure" state, in which all non-secure bus requests are blocked without even reaching the peripheral, nor a "non-secure" state, in which non-secure bus requests are granted full access to all of the peripheral's register interface. Instead, the split-security state allows the peripheral to apply security protection within the peripheral itself, in respective of an individual register or set of registers. This enables security to be provided with finer granularity than in known devices, such as Arm™ TrustZone systems, where a peripheral component is either secure or non-secure. This additional flexibility can be used to provide greater security and/or a more efficient implementation.

Notably, the peripheral component receives security-state signals from the bus system. This is different from known devices that apply bus filtering upstream of the peripheral component itself, such that a secure-state peripheral would not even receive an incoming non-secure bus transaction. The peripheral component may be configured to use the security state of the incoming bus transaction, and the address of the incoming bus transaction, to determine whether to allow or prevent the bus transaction. The peripheral component may comprise register-protection logic for preventing the non-secure bus transaction from accessing the first hardware register.

The peripheral component may be an interface peripheral, such as an SPI (Serial Peripheral Interface) peripheral, UART (Universal Asynchronous Receiver-Transmitter) peripheral, two-wire interface peripheral, I²C (Inter-Integrated Circuit) peripheral. It may be a data-conversion peripheral, such as an ADC (Analogue-to-Digital Converter) peripheral, DAC (Digital-to-Analogue Converter) peripheral, PWM (Pulse Width Modulation) peripheral, quadrature decoder peripheral, or a cryptographic co-processor. It may be a peripheral for controlling an operation of the device, such as a GPIO (General-Purpose Input-Output) control peripheral, for configuring one or more GPIO pins of the device, or a DPPI (Distributed Programmable Peripheral Interconnect) control peripheral, for configuring a peripheral interconnect system on the device.

The register interface may comprise one or more data inputs (e.g., for receiving a cryptographic key) or data outputs (e.g., for outputting state information). It may comprise one or more instruction inputs, for initiating or controlling an operation of the peripheral component (e.g., for initiating a data transfer over a serial port).

While in the split-security state, the peripheral component may additionally be configured to allow secure bus transactions to access the second hardware register.

This split-security state can be useful in many different situations. One example is where the peripheral component is a cryptographic co-processor, which is intended to be used by secure operating-system code, but which it is also desirable to make available to non-secure user-application code. By providing the crypto-processor with a split-security state (either permanently or switchably), certain sensitive registers such as a register for loading a cryptographic key (e.g., embodying the "first hardware register") can be made inaccessible to non-secure data reads from the non-secure application code, to prevent malicious user code reading secret key data, while a plaintext input register (e.g., embodying the "second hardware register") can be accessible to secure and non-secure code, thereby allowing both to perform cipher operations using the secret key. Without the split-security state, it would have been impossible safely to provide the non-secure code with access to the crypto-processor. In this example, even providing a separate non-secure crypto-processor for the non-secure user application to use (which would be costly in terms of chip area) would not be sufficient to address the problem, because the secret key data could still not safely be loaded to the non-secure crypto-processor.

While in the split-security state, the peripheral component may prevent non-secure bus transactions from accessing a first plurality of hardware registers (which includes the first hardware register), while allowing secure bus transactions to access the first plurality of hardware registers. While in the split-security state, the peripheral component may allow non-secure bus transactions (an optionally secure bus transactions) to access a second plurality of hardware registers (which includes the second hardware register).

The identity of the hardware registers to which access is blocked in the split-security state may remain constant (e.g., being hardwired in the register-protection logic of the peripheral), or it may be configurable. In some embodiments, the peripheral component itself may determine which hardware register or registers should have blocked access when in the split-security state.

The peripheral component may be permanently in the split-security state. It may be hardwired in the split-security state. Alternatively, the peripheral component may be switchable between the split-security state and one or more other states, which may include a secure state and/or a non-secure state. It may comprise an input for receiving a signal that controls the security state of the peripheral component. The input may be connected to a system protection unit (SPU)—e.g., by a dedicated line. The system protection unit may provide a register interface for controlling the state of the peripheral component, and optionally of other peripheral components and/or memory regions and/or master components (such as peripherals that contain DMA controllers). Software executing on the processor (e.g., bootloader code) may determine the security state of the peripheral component, e.g., by writing to a register of such a system protection unit. Once the security state of the peripheral is set to the split-security state, it may remain in this state until the device is next reset, although this is not essential.

The peripheral component may support a secure state. When the peripheral is in the secure state, the device preferably prevents non-secure bus transactions from even reaching the peripheral component—e.g., using hardware filter logic as disclosed below. Alternatively, the peripheral component could be configured, in the secure state, to receive a non-secure bus transaction but to prevent it from accessing the first hardware register and the second hardware register (and optionally all other hardware registers in the register interface). While in the secure state, the peripheral component preferably does, however, allow secure bus transactions to access the first hardware register and the second hardware register (and optionally all other hardware registers in the register interface).

The peripheral component may support a non-secure state in which the peripheral component is configured to allow non-secure and secure bus transactions to access the first hardware register and the second hardware register (and optionally all other hardware registers in the register interface).

While in the split-security state, the peripheral component may be configured to prevent only a certain type or types of non-secure bus transaction from accessing the first hardware register. It may prevent only one or two of: a non-secure data-read bus transaction, a non-secure data-write bus transaction, and a non-secure instruction-fetch bus transaction, from accessing the register. For example, it may block non-secure data writes to the first hardware register, but allow non-secure data reads and non-secure instruction fetches from the first hardware register. It may apply different access conditions that depend on the type of bus transaction to different respective registers of the register interface.

While in the secure state, the device may be configured to prevent all bus transactions, of every type, from accessing any register of the register interface of the peripheral component.

While in the split-security state, the peripheral component may prevent access to a hardware register in any appropriate way. For example, for a write transfer, it may acknowledge the bus request, but not change the data in the register. For a read or instruction-fetch transfer, it may return zero data, regardless of the content of the register. In some embodiments, the peripheral component may otherwise continue as normal. However, in other embodiments, it may return a bus error signal and/or generate an interrupt to the processor and/or trigger a reset of the device in response to detecting an unauthorised bus request. For example, it may trigger a SecureFault exception on an Arm™ processor.

The device may comprise hardware filter logic for intercepting and filtering bus transactions at points in the bus system. This filter logic may prevent non-secure bus transactions from accessing secure memory regions and/or peripherals that are in a secure state. One desirable feature of the split-security peripheral state is that it is not necessary for the filtering in the bus system (e.g., at the processor) to be any different for this peripheral component than for peripheral components that do not support a split-security state. So long as both secure and non-secure bus transactions are allowed to reach the peripheral component, the preventing and allowing of access to particular registers can then be handled by register-protection logic within the peripheral itself. This can avoid complicating the design of the secure-aware bus system and the processor.

The processor may be switchable between a secure state and a non-secure state. The processor may determine its own security state—e.g., through software instructions executing on the processor. It may be configured to initiate secure bus transactions when in the secure state, and to initiate non-secure bus transactions when in the non-secure state. The device may comprise one or more further processors or other bus masters which may initiate secure and/or non-secure bus transactions.

The peripheral component may be a slave on the bus system. However, it may additionally be a bus master. It may comprise an integral DMA (direct memory access) controller for initiating bus transactions on the bus system. The DMA controller may be configured to output security-state signals onto the bus system. The peripheral component may be configured to initiate secure bus transactions when the peripheral component is in a secure state, and may be configured to initiate non-secure bus transactions when the peripheral component is in a non-secure state and/or when the peripheral component is in the split-security state.

However, in some embodiments, the peripheral component may be in the secure state, but still be configured to initiate non-secure bus transactions on the bus system. While this behaviour may appear counterintuitive at first, the applicant has determined that it can provide security benefits in certain situations. This configuration may be an optional mode within the secure state—i.e., the peripheral may be configurable either to initiate bus transactions as secure or as non-secure, when the peripheral is in the secure state. This configuration may be set through a register in the security protection unit. For convenience, this configuration will be referred to herein as the "secure-in-and-non-secure-out" state.

This state can help improve security by preventing non-secure code (e.g., a malicious user application) from causing secure code (e.g., by invoking a kernel function) to perform a peripheral operation that results in the peripheral component reading data from, or writing data to, a secure region of memory. If this were allowed, it could be possible for non-secure code to cause the peripheral to read sensitive data from a secure region of memory and then write the same data to a non-secure region of memory, from which the non-secure code can access it, thereby compromising the security of the data. When the peripheral component is in the secure-in-and-non-secure-out state, this is not possible, because any attempt by the peripheral to read from, or write to, a secure region of memory can be blocked by the device—e.g., using hardware filter logic in the bus system.

This secure-in-and-non-secure-out state is not restricted to peripherals that support a split-security state, but may be implemented in other peripheral components too.

Thus, from a further aspect, the invention provides an integrated-circuit device comprising:
  a processor;
  a peripheral component;
  a bus system, connected to the processor and to the peripheral component, and configured to carry bus transactions; and
  hardware filter logic,
  wherein:
  the bus system is configured to carry security-state signals for distinguishing between secure bus transactions and non-secure bus transactions;
  the peripheral component comprises a register interface, accessible over the bus system, the register interface comprising a hardware register;
  the peripheral component comprises a direct-memory-access (DMA) controller for initiating bus transactions on the bus system; and
  the peripheral component supports a secure-in-and-non-secure-out state in which:
    the hardware filter logic is configured to prevent non-secure bus transactions from accessing the hardware register of the peripheral component, but to allow secure bus transactions to access the peripheral component;
    the peripheral component is configured to allow an incoming secure bus transaction to access the hardware register; and the peripheral component is configured to initiate a bus transaction on the bus system as a non-secure bus transaction.

From another aspect, the invention provides a method of operating an integrated-circuit device, wherein the integrated-circuit device comprises:

a processor;
a peripheral component; and
a bus system, connected to the processor and to the peripheral component,
and configured to carry secure bus transactions and non-secure bus transactions,
wherein the peripheral component comprises a register interface, accessible over the bus system, the register interface comprising a hardware register,
the method comprising the peripheral component being in a secure-in-and-non-secure-out state and, while the peripheral component is in the secure-in-and-non-secure-out state:
preventing non-secure bus transactions from accessing the hardware register of the peripheral component;
allowing an incoming secure bus transaction to access the hardware register; and
the peripheral component initiating a non-secure bus transaction on the bus system.

Thus, it will be seen that, in accordance with these aspects of the invention, a peripheral can initiate non-secure bus transactions while preventing non-secure bus transactions from accessing the hardware register of the peripheral. This can prevent the peripheral from being used to compromise the security of the device, as explained above.

Features of the earlier aspects disclosed herein may be features of embodiments of these aspects also, and vice versa. Features of the split-security peripheral component may be features of this peripheral component also, and vice versa.

The hardware filter logic may be configured to prevent non-secure bus transactions from accessing the peripheral component at all.

The hardware filter logic could be implemented within the peripheral component. However, more preferably, the hardware filter logic is configured to intercept bus transactions at one or more points within the bus system, such as adjacent the processor and/or adjacent a memory and/or at an interception point within the bus system, the interception point being positioned within the bus system such that bus transactions from at least two master components (which may include the processor) pass the interception point, and such that bus transactions for at least two slave components (which may include the peripheral component) pass the interception point. The hardware filter logic may use the slave address of an intercepted bus transaction, and the security state of the intercepted bus transaction, to determine whether to allow the intercepted bus transaction. It may block intercepted bus transaction that are determined not to be allowed. It may determine this in accordance with filtering rules that determine, for each pairing of master component and slave component, whether secure bus transactions initiated by the master component should be received by the slave component, and whether non-secure bus transactions initiated by the master component should be received by the slave component. The filtering rules may be specified at the component level (where a component may be a particular peripheral, or a particular region of memory), rather than at the address level. In other words, bus transactions for every address assigned to a particular peripheral may be treated in the same way, by the hardware filter logic. The filtering rules may additionally depend on the security states of the slaves components. The hardware filter logic may comprise one or more filter units for intercepting bus transactions at respective interception points.

In any aspects disclosed herein, the device may comprise a plurality of peripheral components, any of which may support a split-security state and/or a secure-in-and-non-secure-out state.

The device may comprise a memory. The memory may comprise volatile memory, such as RAM, and/or non-volatile memory, such as flash. The hardware filter logic may comprise a memory controller for controlling access to the memory. The memory may comprise one or more secure regions and one or more non-secure regions.

The peripherals may have respective memory-mapped register interfaces, accessible over the bus system. The device may implement a global memory map which assigns respective addresses to one or more memories (e.g., RAM and flash) and to respective peripherals.

The hardware filter logic may be a hardware state machine. It may comprise any number of logic gates. It preferably does not contain a general-purpose processor. It may comprise one or more input or output registers which may be addressable over the bus system, although this is not essential. The security protection unit may similarly be a hardware state machine.

The security-state signals may be sent over a security-state signal line in the bus system. The security-state signal line may be a dedicated line that is only used to indicate a security state. The line may be a single-bit line. In some embodiments, the security-state signal line may be asserted to indicate a secure bus transaction and de-asserted to indicate a non-secure bus transaction. In other embodiments, it may be the other way around. In general, it will be appreciated that outputting a security-state signal representing a non-secure state might, in some embodiments, consist of not outputting a signal representing a secure state (i.e., remaining silent), or vice versa.

In some embodiments, the bus system is an AMBA bus system. It may comprise one or more AHB's and/or one or more APB's. The bus system may implement the AHB 3, AHB 5 or higher specification. The secure-state signal may be sent over an AHB HNONSEC signal line—e.g., by de-asserting HNONSEC to communicate the secure-state signal.

The bus system may comprise a main bus (e.g., an AHB) and a peripheral bus. The peripheral component could be attached to the main bus or to the peripheral bus. The peripheral bus may comprise a security-state signal line for carrying the security-state signal to one or more slave components attached to the peripheral bus. In some embodiments, an APB PPROT[1] signal may be used to convey the security state, or a non-standard (non-APB) signal. The security-state signal line on the peripheral bus may propagate a security-state signal received by the peripheral bus from the main bus. The provision of a security-state signal line on the peripheral bus allows a peripheral component that is connected to the peripheral bus to support the split-security state, because it can receive the security-state signals.

It will be appreciated that some embodiments may support more than two security states for master components and/or for slave components—e.g., having three states: a non-secure state, a secure state, and a very-secure state. The bus system may be configured to carry security-state signals that distinguish between three or more security states for each bus transaction.

The integrated-circuit device may be a system-on-chip, multiprocessor system-on-chip, radio-on-chip device, or any other form of integrated circuit.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
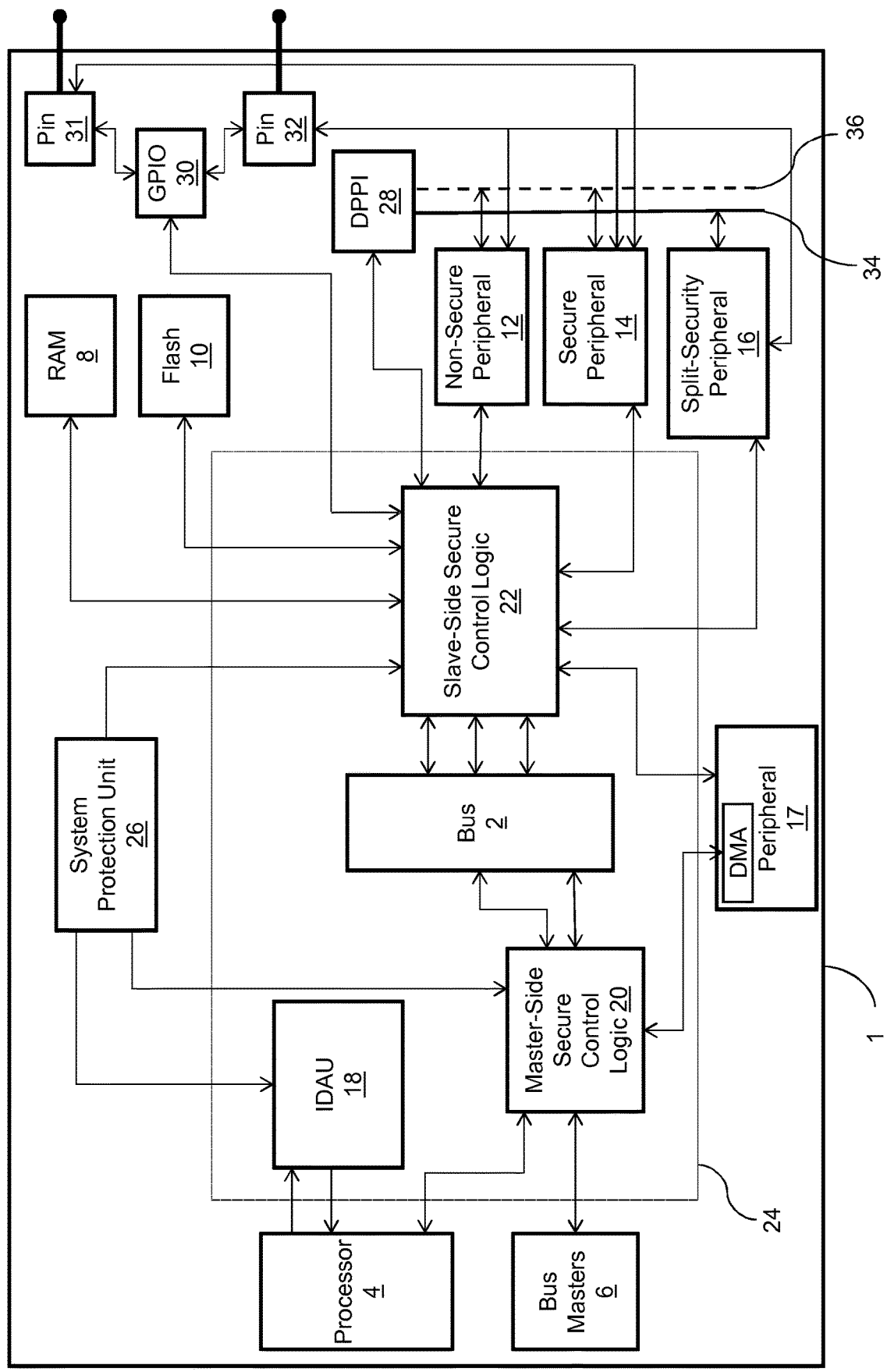
FIG. 1 is a schematic drawing of an integrated-circuit device embodying the invention.

FIG. 1 shows a system-on-chip (SoC) integrated circuit device 1 in accordance with an embodiment of the present invention.

The device 1 includes a bus interconnect system 2 connecting a processor 4 and other bus masters 6 to RAM 8, flash memory 10 and exemplary peripherals 12, 14, 16, 17. The peripherals 12, 14, 16, 17 have input and/or output registers that are addressable over the bus system 2 (i.e., memory-mapped I/O).

The bus system 2 may comprise a number of interconnected buses. In some embodiments, it is an Arm™ AMBA (advanced microcontroller bus architecture) bus system, and contains one or more Arm™ AHB's (advanced high performance buses) and one or more Arm™ APB's (advanced peripheral buses).

The master components 4, 6 are configured to issue bus requests on the bus interconnect system 2. The bus masters 6 may be other processors, peripherals with built-in DMA controllers, or any other bus masters. The bus requests can be either secure or non-secure bus requests depending on a security attribute of the master component 4, 6. The security attribute of the processor 4 is variable, depending the current state of the processor 4—it is typically under the control of software executing on the processor 4. The security attributes of other bus masters 6 may be fixed (i.e., hard-wired) or variable.

The memory 8, 10 and peripherals 12, 14, 16, 17 are configured to be responsive to certain requests depending on a respective security attribute of the memory or peripheral. The RAM 8 and flash memory 10 may be divided into regions which are assigned different respective security attributes (i.e., "secure" memory regions and "non-secure" memory regions).

The various memory regions and peripherals may be responsive to secure requests, non-secure requests, or both types of request. The security attribute of each memory region or peripheral may be fixed at the design stage or may be dynamically configurable.

Some peripherals 12 may be designated (permanently or switchably) "non-secure" peripherals and have all of their functions available to a bus master 4, 6 that is in a non-secure state. Some peripherals 14 may be designated (permanently or switchably) "secure" peripherals and have all of their functions available only to bus masters 4, 6 that are in a secure state. Still other peripherals 16 may be "split-security" peripherals, and, when designated (permanently or switchably) as "non-secure", such peripherals 16 will have some functions that are accessible to non-secure bus masters 4, 6 and other functions that are accessible only to secure bus masters 4, 6.

Some of the peripherals 17 are slave components on the bus system 2, but also contain DMA (direct memory access) controllers that allow them to act as bus masters—e.g., for reading or writing data from the RAM 8 without the involvement of the processor 4.

The device 1 further includes a general purpose input/output (GPIO) controller 30 which controls access to GPIO pins 31, 32, to which devices external to the device 1 can be connected. Each GPIO pin 31, 32 can have a security attribute assigned to it, as described in more detail below. The GPIO controller 30 has a register interface and acts as a further peripheral.

The device 1 further includes a distributed programmable peripheral interconnect (DPPI) 28. The DPPI 28 provides a matrix of interconnects, separate from the bus system 2, which connects peripherals 12, 14, 16 and allows one peripheral to signal an "event" to one or more other peripherals. Receipt of an "event" signal, over the DPPI 28, by a subscribing recipient peripheral, can trigger a task by the other peripheral.

The DPPI 28 provides a number of channels 34, 36 (two exemplary channels are shown in FIG. 1, but there may be more than two channels), which connect event outputs to task inputs. The peripherals 12-16 contain multiplexers, controllable by the processor 4 through respective register interfaces, for subscribing an event output of a peripheral to a particular channel, and for subscribing a task input of a peripheral to a particular channel.

The DPPI 28 provides a register interface for configuring the channels over the bus system 2, and is effectively a further slave peripheral.

The DPPI 28 can be used to support peripheral-to-peripheral communication while the processor 4 is in a sleep state, thereby providing substantial power savings compared with processor-mediated communication over the bus system 2.

Each channel 34, 36 can be defined as either secure 34 or non-secure 36. Only "secure" peripherals 14 can access a secure channel, to issue an event towards another peripheral, or to subscribe to the channel. If a "non-secure" peripheral 12 (which could be a split-security peripheral 16, when set to a "non-secure" state) attempts to push an event on a secure channel 34 then nothing will happen. If a non-secure peripheral 12, 16 attempts to subscribe to the secure channel 34 then it will not see any of the events on this channel.

The bus system 2 further comprises an implementation-defined attribution unit (IDAU) 18, master-side secure control logic 20, and slave-side secure control logic 22. The bus system 2, together with this secure control logic 20, 22 and attribution unit 18, are referred to herein as the security system logic 24 of the device 1.

This hardware security system logic 24 implements filtering rules that determine, for each pairing of master component 4, 6 and slave component 12, 14, 16, whether secure bus requests from the master component are receivable by the slave, and whether non-secure bus requests from the master component are receivable by the slave component. The filtering rules may also determine access permissions for the master components 4, 6 to defined regions of the RAM 8 and/or flash memory 10.

These filtering rules are typically fixed (i.e., hardwired) by design for every possible pairing of i) secure master to secure peripheral or memory region, ii) secure master to non-secure peripheral or memory region, iii) non-secure master to secure peripheral or memory region, and iv) non-secure master to non-secure peripheral or memory region. However, in some embodiments, the filtering rules may be configurable—e.g., depending at least partly on configuration data stored in the flash memory 10. The filtering rules may be relatively simple—for example, every secure bus-master can access every slave component (i.e. every peripheral and every memory region), whether the slave device is in a secure state or a non-secure state, while every non-secure bus-master can access only non-secure slave components and is blocked from accessing any secure slave component. Alternatively, the filtering rules may be more complex—for example, assigning different access rights to different bus-masters and/or different slave components, such that, e.g., a first processor can access a secure peripheral while the first processor in a secure state, whereas a second processor cannot access the same secure peripheral at all.

The device 1 further comprises a system protection unit (SPU) 26. The SPU 26 acts as a central point in the system to control access to memories, peripherals and other resources. The SPU 26 and security system logic 24 together provide the following features:

Arm™ TrustZone™ support, allowing definition of Secure, Non-Secure and Non-Secure Callable memory regions;

protects memory regions and peripherals from non-processor master devices, such as DMA controllers;

DPPI 28 access protection, preventing non-secure code from publishing or subscribing to secured DPPI channels;

GPIO pin access protection, preventing non-secure code and peripherals from reading or changing the state of a secure pin 31, 32; and external domain access protection, controlling access rights from other microcontrollers.

The SPU 26 provides a register interface comprising a set of configuration registers for controlling the various internal logic blocks 18, 20, 22 of the security system logic 24 that monitor access to memory-mapped slave devices (RAM 8, Flash 10, peripherals 12-17, etc.) and other resources (device pins 31, 32, DPPI channels, . . . ). The state of the SPU 26 determines the security states of all non-security-aware bus masters 6 and slave components 8, 10, 12-17. The SPU 26 also provides an interface for setting DPPI channels and GPIO pins as secure or non-secure. The SPU's register interface may itself be writable only by secure bus requests from the processor 4. The register interface may also contain "lock" bits which, once set, prevent further changes to the contents of respective parts of the SPU register interface until the device 1 is next reset. In this way, secure boot code can configured the SPU 26 during a boot process, and then lock the security state of the device 1 until it is next reset.

The master-side secure control logic 20 and slave-side secure control logic 22 provide a number of filter units (or firewalls), which intercept bus transfers and implement the filtering rules. These monitor access to the RAM 8, flash memory 10, memory-mapped peripherals 12, 14, 16, 17, including the GPIO controller 30, and the DPPI 28.

The filter units may be located at the edges of the bus system 2 and/or at points within the bus matrix, such as at a bridge between individual buses and/or at a bus arbiter and/or between two layers of the bus system 2. At least one firewall is located within the bus system 2, away from the edges of the bus system 2. The filter units compare the address, security state (secure or non-secure), and access type (data-read, data-write, instruction fetch), of each intercepted bus transfer with security definitions provided in the SPU 26. The security state of a bus transfer is determined by the security state of the master component that initiated the bus transfer, which can be either "secure" or "non-secure". In other embodiments multiple security statuses, or levels, may be supported (i.e., more than just two statuses).

When a prohibited access is detected, the firewall blocks the transfer (by returning a zero if it is a read access, or blocking a write operation). In some embodiments, the filter units may provide error signals through the bus system 2 and/or may trigger processor interrupts or a system reset.

The IDAU 18 can be used to indicate to the processor 4 whether particular memory addresses are Secure or Non-secure, under the control of the SPU 26. For a CPU 4 that supports ARM™ TrustZone™ for Cortex-M™, the SPU 26 controls the IDAU 18 to provide full support for:

ARM™ TrustZone™ for Cortex-M™ related instructions such as TT for reporting the security attributes of a region; and Non-Secure Callable (NSC) regions, to implement Secure entry points from Non-Secure code.

Figure 2:
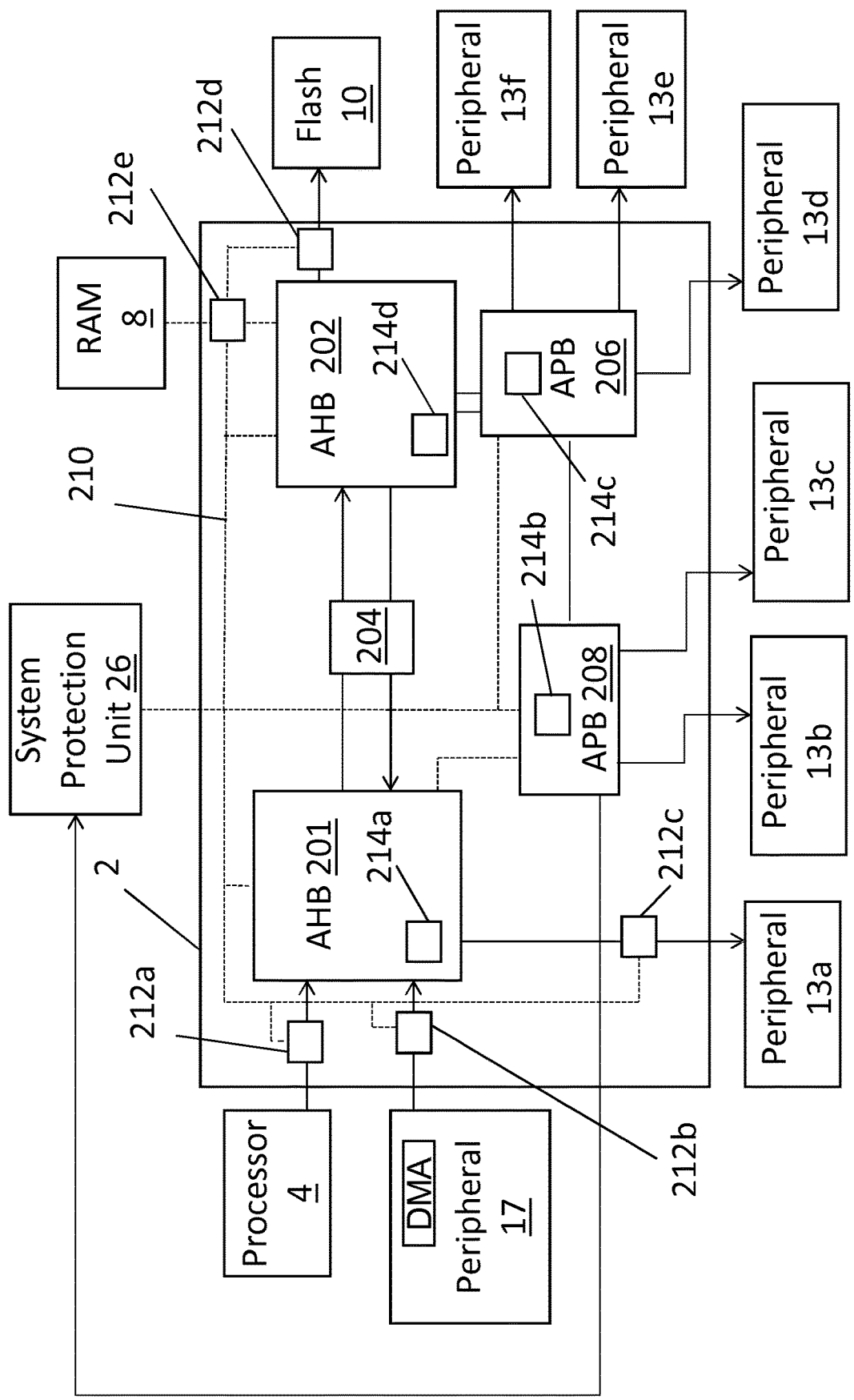
FIG. 2 is a schematic drawing of the integrated-circuit device showing further details of the bus system and the bus filtering.

FIG. 2 shows many of the same components as FIG. 1, with all like parts labelled with the same reference numerals as in FIG. 1.

The bus system 2 is shown as including a first AHB 201, a second AHB 202, a first APB 208, and a second APB 208. The first AHB 201 is connected to the second AHB 202 by means of bridge 204. Various exemplary slave peripherals 13a-13f (which may overlap with the peripherals 12, 14, 16, 17 shown in FIG. 1) are shown connected to the bus system 2. One exemplary peripheral 17 that has an integral DMA controller is connected, as a bus master, to the first AHB 201. Of course, there may be many more bus masters than are shown (e.g., ten, twenty, fifty or more) and many more slave peripherals than are shown (e.g., one hundred, two hundred or more).

FIG. 2 provides more detail of how the control logic 20, 22, represented schematically in FIG. 1, is integrated with the bus system 2. The control logic 20, 22 is implemented through a set of edge filter units 212a-212e positioned at the edges of the bus system, as well as a set of internal filter units 214a-214d positioned at points within the bus system 2, all connected by control lines 210. Some of the edge filter units 212 are located adjacent master components such as the processor 4 and exemplary DMA-equipped peripheral 17, while others are located adjacent slave components, such as a slave peripheral 13a. The internal filter units 214 are positioned at the arbiters of the AHBs 201, 202 and APBs 206, 208 or between pairs of layers in the bus system 2. In this way, the internal filter units 214 can implement master-to-slave filtering rules that apply to more than one bus master, more efficiently than if these rules were to be implemented using the edge filter units 212 adjacent the respective bus masters.

The filter units 212, 214 are configured to prevent bus transfers that do not comply with the filtering rules. The filtering rules for each master-slave pair are hardwired by the control logic 20, 22, for a given security state of the master and a given security state of the slave.

However, the security state of at least some of the masters 2, 17 and slaves (RAM 8, flash 10, and exemplary peripherals 13a-f) are configurable, being set by the components themselves (where the components are security-aware), or being set through the system protection unit (SPU) 26, for all non-security-aware components. For components that manage their own security status, their current secure/non-secure state is distributed over lines to relevant points in the filter logic 20, 22; this distribution may be direct from the component to the filter logic 20, 22, or the status may be sent via the SPU 26. The SPU 26 is the only place where the security attributes of components that are not inherently security-aware can be configured.

In some embodiments, the size and position of secure regions within the RAM 8 and flash memory 10 may be defined by writing to registers in the SPU 26—e.g., by writing start and end addresses. In other embodiments, the RAM 8 and flash 10 are pre-divided into fixed regions, each of which can have a respective security state set through the SPU 26. For example, the RAM 8 may be divided into 16 regions of 8 KiB each, and the flash 10 may be divided into 32 regions of 32 KiB each.

For each memory region, four different types of permissions can be independently configured through the SPU 26:
"Read": to allow data read access to the region (code fetch from this region is not controlled by the Read permission but by the Execute permission described below);
"Write": to allow write access to the region;
"Execute": to allow code fetch from this region (even if data read is disabled); and
"Secure": to allow only secure bus accesses.

For every security-managed component, there is at least one respective line out of the SPU 26 that communicates the security state of that component to the control logic 20, 22 (i.e., to the appropriate filter units 212, 214) as a one-bit value. The SPU 26 can also communicate the security state of paths within the bus system 2, and of groups of components, to the filter logic 20, 22, 212, 214 in the bus system.

The SPU 26 allows non-secure-aware processors and non-secure-aware peripherals to be treated, by software developers, as security-aware components, even though they are not inherently security aware. The security states that are output by the SPU 26 for non-secure-aware components may be determined by configuration settings stored in SPU configuration registers. These configuration registers may be written to by a bootloader after each reset, or may be configured by any other appropriate mechanism.

For some of the peripherals 12, 13, 14, 17 (typically most of the peripherals), the whole peripheral is always entirely in a secure state or entirely in a non-secure state, with the same secure and non-secure filtering rules being applied to bus requests addressed to the peripheral, irrespective of the specific memory address.

Also, for such peripherals 12, 13, 14, 17, any DMA accesses carried out by the peripheral are also assigned the same security state as the peripheral—i.e., such that, when the SPU 26 has configured a peripheral 17 to be in a secure state, the secure signal will be set on all bus transactions initiated by a DMA controller of the peripheral 17, and when the peripheral 17 is in a non-secure state, all of the peripheral's DMA accesses will also be non-secure.

However, for other peripherals 13 this is not necessarily the case. Certain peripheral 16 may be "split-security" peripherals, while others peripheral may have non-standard DMA security behaviour, as explained below.

A split-security peripheral 16 appears, at the system level, as a non-secure component—i.e., typically being responsive to both secure and non-secure bus requests—when set to a non-secure state. However, internally, the peripheral 16 can have different security states assigned to different registers of the peripheral, and therefore respond differently to secure bus requests compared with non-secure bus requests. In particular, the peripheral 16 may be register interfaces that provide access to functions or information when addressed by secure bus requests, but which appear blank or unresponsive when addressed by non-secure bus requests.

Figure 3:
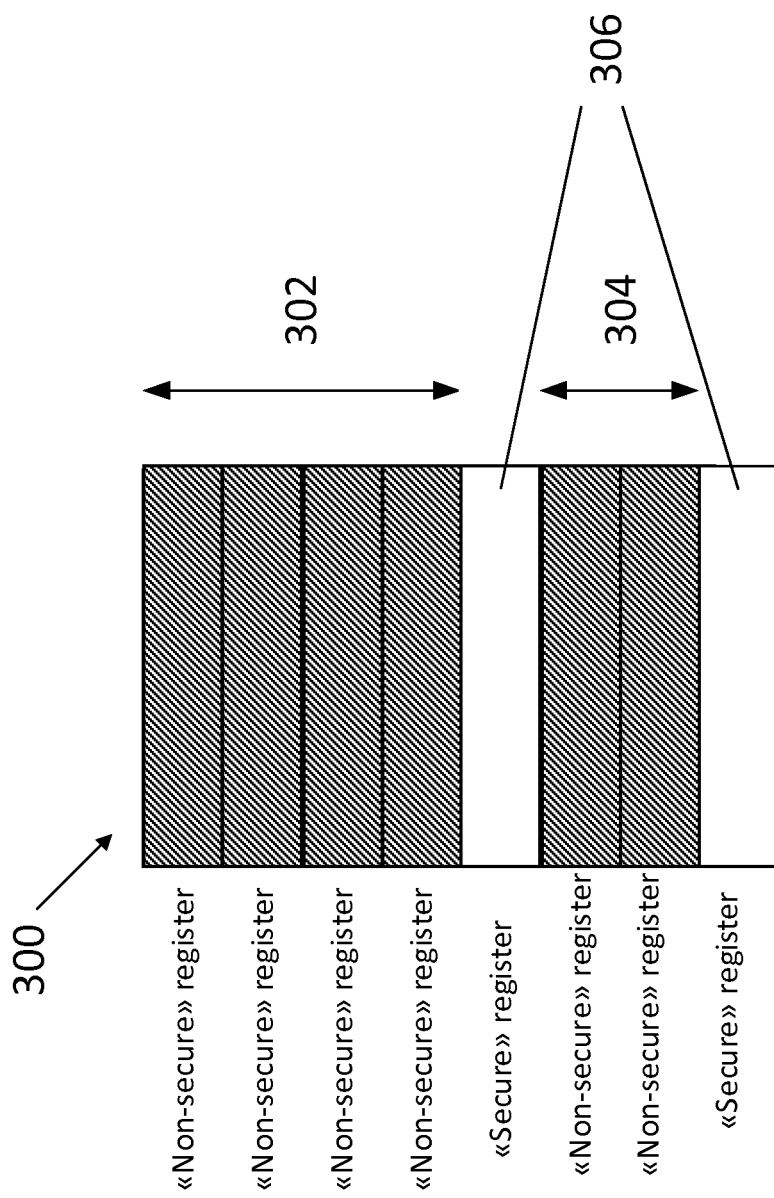
FIG. 3 is a schematic drawing of the register interface of a split-security peripheral that is integrated on the device.

FIG. 3 shows an example of a register interface 300 for a split-security peripheral 16. This peripheral 16 has two groups of "non-secure" registers 302, 304, shown as hatched areas, which will typically be accessible by non-secure masters (and which may also be accessible by secure masters, depending on the implemented filtering rules). The two non-shaded registers 306 are secure registers and will typically be accessible only by secure masters. If a non-secure bus request attempts to read one of the secure registers 306, the peripheral 16 will return zero values. If a non-secure bus request attempts to write to one of the secure registers 306, the peripheral 16 will ignore the write operation.

Note that, in contrast to secure peripherals, the non-secure bus request is not filtered by a firewall in the bus system 2, but is allowed to reach the peripheral 16. The peripheral 16 itself therefore reads the security signal from the bus system 2, accompanying the bus request, and determines how to respond, based on the security state of the bus request.

The split-security peripheral 16 can be switched, through the SPU 26, between a secure state, in which non-secure-state bus transactions will be filtered in the bus system 2 and will not reach the peripheral 16, and a non-secure state which equates to the split-security state.

Figure 4:
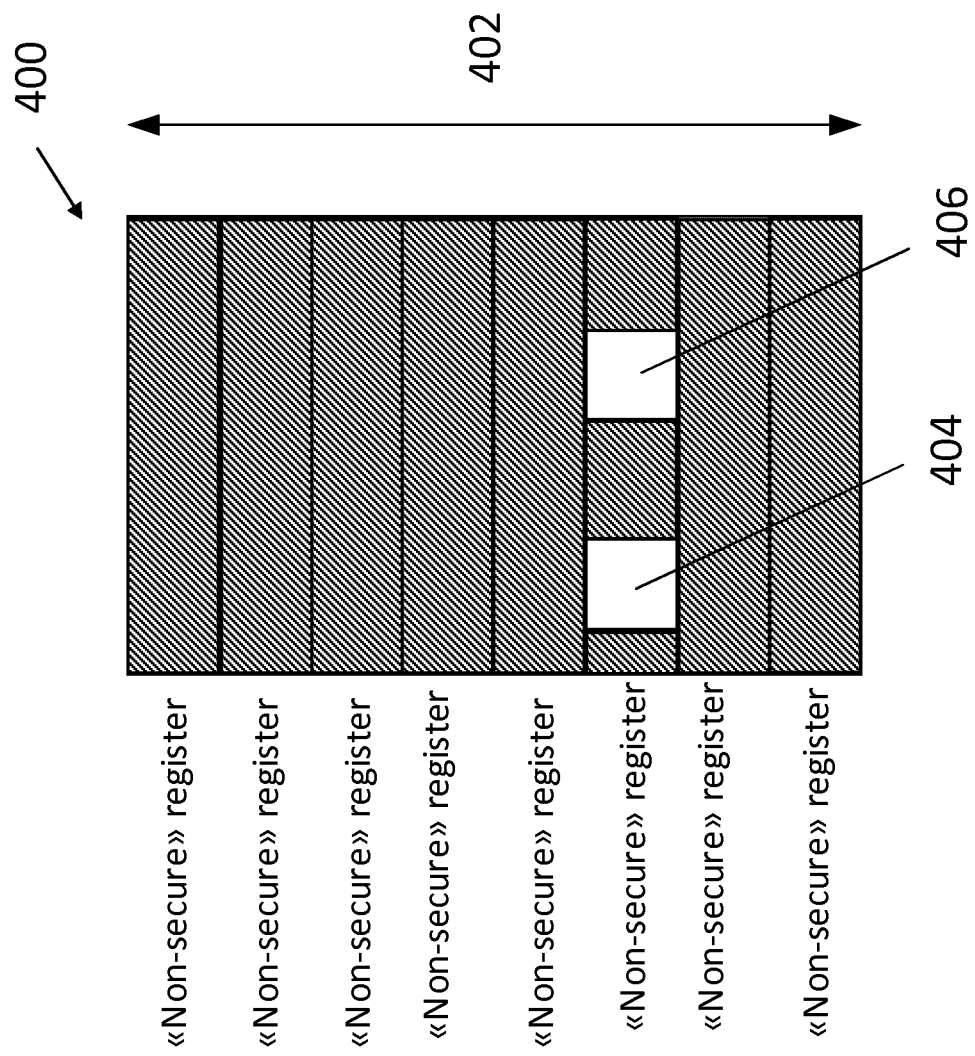
FIG. 4 is a schematic drawing of the register interface of a further split-security peripheral that is integrated on the device.

FIG. 4 also shows an example of a different register interface 400 for another split-security peripheral. In this case, all of the registers 402 are non-secure, but the particular bit fields 404 and 406 are secure bit fields which will typically be accessible only to secure code. Any code executing on a processor 4 that is in a non-secure state that attempts to read these secure bit fields 404, 406 will read zero bits, regardless of the actually values of these bits.

As already noted, security states are defined per peripheral and not by address ranges.

Peripherals that have a hardwired "non-secure" security mapping have their memory-mapped I/O addresses starting with 0x4XXX_XXXX.

Peripherals that have a hardwired "secure" security mapping have their memory-mapped I/O addresses starting with 0x5XXX_XXXX.

Peripherals that have a user-selectable security mapping are available at an address starting with:
0x4XXX_XXXX, if the peripheral security state is set as "Non Secure"; and
0x5XXX_XXXX, if the peripheral security state is set as "Secure".

Peripherals that have a split-security mapping are available at an address starting with:
0x4XXX_XXXX for non-secure accesses and 0x5XXX_XXXX for secure accesses, if the peripheral security state is set as "Non Secure"; and 0x5XXX_XXXX, if the peripheral security state is set as "Secure".

The secure registers of split-security peripherals in the 0x4XXX_XXXX range are not visible from secure code or from non-secure code; writes to these register addresses will be ignored and reads will return zero. Secure code can access both non-secure and secure registers in the 0x5XXX_XXXX range, but any access to the 0x5000_0000-0x5FFF_FFFF address range from non-secure code will be ignored and generate a SecureFault exception.

For peripherals 13 that include DMA controllers (and so are master components as well as being slave components), the standard DMA behaviour is for the DMA controller to output the same security state as the peripheral it belongs it. However, some peripherals 13 (which may include split-security peripherals 16) may exhibit non-standard DMA security behaviour. For such peripherals, the SPU 26 provides a special, per-peripheral, configuration bit which, when set, causes the standard behaviour to be overridden. When this bit is set, accesses generated by the DMA controller of the peripheral are non-secure even when the peripheral itself is set to the secure state.

This can be useful when only secure code, executing on the processor 4, is allowed to manage the peripheral, but where data output from the peripheral by DMA needs to be accessed by non-secure code. For example, a cryptographic accelerator may be configured as a secure peripheral, so that only secure operating-system code can control it. However, non-secure user code may be able to invoke cryptographic operations by making a function call or system call to the operating-system. If the DMA controller of the crypto-accelerator were to output decrypted plaintext to RAM 8 or flash 10 in a secure mode, it could be possible for malicious user code to overwrite sensitive data or to inject malicious software instructions into a secure kernel region. By using the SPU 26 to configure the crypto-engine to implement the non-standard DMA security behaviour, the plaintext data will then be written to memory using non-secure data-write bus requests. This prevents any possibility of the output data being written to a secure region of memory. This improves the security of the device 1.

A crypto-accelerator is just one example; this non-standard DMA security behaviour can be useful whenever secure code manages a peripheral, but non-secure code needs to access the data produced by the peripheral.

Figure 5:
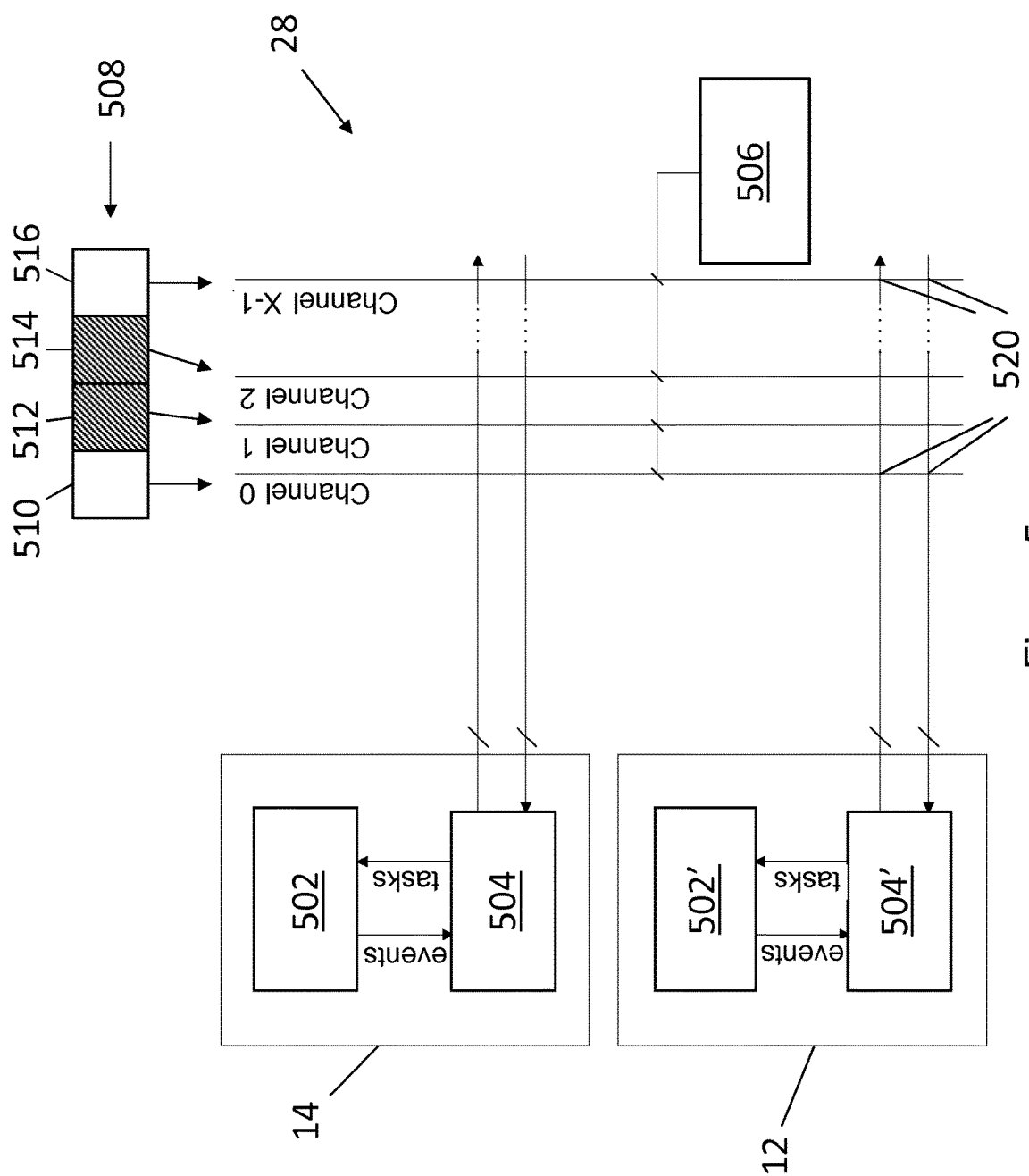
FIG. 5 is a schematic drawing showing more details of the Distributed Programmable Peripheral Interconnect (DPPI) that is integrated on the device.

FIG. 5 shows the Distributed Programmable Peripheral Interconnect (DPPI) 28 of FIG. 1 in more detail. The DPPI 28 includes a DPPI controller (DPPIC) 506, which provides a register interface for configuring the DPPI 28 over the bus system 2. The DPPI controller 506 is an example of a split-security peripheral.

The DPPI 28 provides a number of channels, here labelled 0, 1, 2, . . . , X−1, which can be used to interconnect peripherals of the device 1. FIG. 5 only shows two peripherals 12, 14 by way of example; however, the DPPI 28 will typically be connected to many more of the peripherals 13. Each peripheral comprises a peripheral core 502, 502' and a PPI bus 504, 504'. The core 502 signals to the PPI bus 504 when predetermined events occur in the core 502 (e.g., when a cryptographic core completes an encryption operation). The PPI bus 504 can also signal task inputs to the peripheral core 502, which instruct the core 502 to perform a predetermined task (e.g., to output data over an SPI connection). As explained above, with reference to FIG. 1, the DPPI 28 can be used to provide peripheral-to-peripheral signalling without requiring a processor interrupt or other processor involvement.

Tasks are used to trigger actions in a peripheral 12, 14—for example, to start a particular behaviour. A peripheral 12, 14 can implement multiple different tasks. Each task has a separate task register in the peripheral's task register group. A task can be triggered when a bus master (e.g., software executing on the processor) writes a '1' to the task register, or when the peripheral itself or another peripheral toggles the corresponding task signal by means of an event signal sent over the DPPI 28.

Events are used to notify peripherals 12, 14 and the processor 4 about events that have happened—for example, a state change in a peripheral. A peripheral 12, 14 may generate multiple different events. Each event has a separate event register in the peripheral's event register group. An event is generated when the peripheral itself toggles the corresponding event signal, leading to an event signal being output onto any DPPI 28 channel to which the event has been subscribed. The event register is also updated to reflect that the event has been generated (in case the processor wishes to monitor the event register, for instance).

Each channel of the DPPI 28 can be defined as "secure" or "non-secure" through the system protection unit (SPU) 26. The SPU 26 includes a DPPI security attribute register 508, addressable over the bus system 2. Respective bits in the DPPI security attribute register 508 correspond to respective channel of the DPPI. Each bit indicates the security state of its corresponding channel. In this example, bits 510 and 516 corresponds to Channels 0 and X−1, respectively, and in this case indicate that these channels are secure channel. Bits 512 and 514 correspond to Channels 1 and 2, respectively, and indicate that these channels are non-secure. Once the security attribute register 508 has been configured (e.g., by secure boot code), its contents can be locked (i.e., no further writes allowed) until the device 1 is next reset, by setting a bit in an associated "lock" register (not shown).

Only a peripheral 14 in the secure state can push events to a secure channel. If a non-secure peripheral 12 tries to push an event to a secure channel 0, X−1, then nothing will happen. If a non-secure peripheral 12 tries to subscribe to a secure channel 0, X−1 it will not see any events. The connections 520 between the PPI bus 504' of the non-secure peripheral 12 and the secure channels 0, X−1 are blocked by firewalls in the DPPI 28.

The DPPI controller (DPPIC) 506 provides a register interface for enabling and disabling each channel. It also allows a bus master to define groups of channels. This then allows a bus master to enable or disable all the channels within a group, conveniently, through a single register write. If all the channels of a group are non-secure, the group is considered to be non-secure. If at least one of the channels of the group is secure, then the group is considered as secure. A bit-field position for enabling and disabling a secure channel of secure group of channels can only be written to by a bus master that is in secure mode, while a bit-field position for enabling and disabling a non-secure channel or group of channels can be written to by secure and non-secure bus requests.

The DPPI controller 506 is a split-security peripheral in that it appears to the hardware security system logic 24 in the bus system 2 as a non-secure peripheral, but reacts differently to secure and non-secure accesses.

Figure 6:
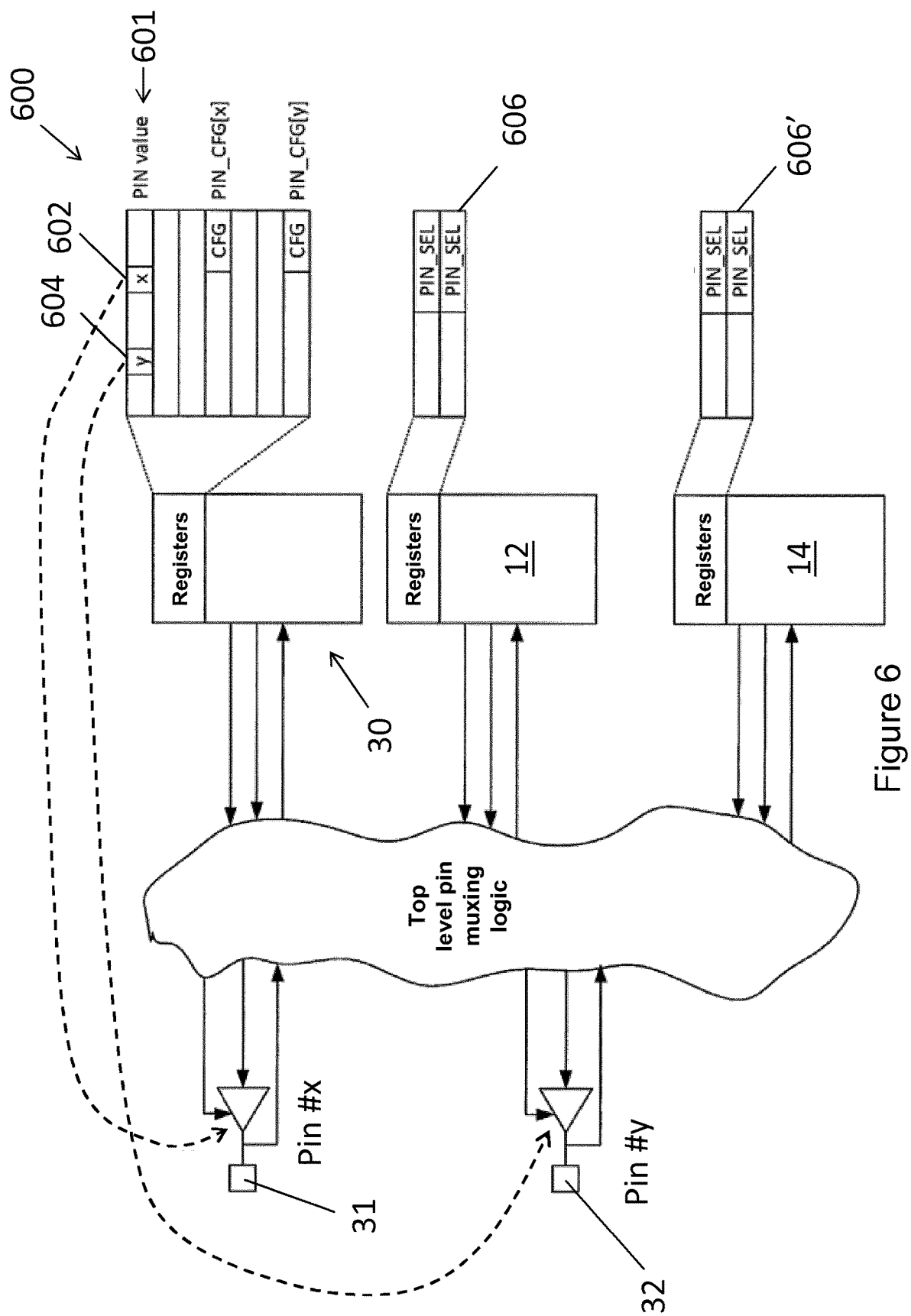
FIG. 6 is a schematic drawing showing more details of the GPIO peripheral that is integrated on the device.

FIG. 6 shows the GPIO controller peripheral 30 of FIG. 1 in more detail.

Two exemplary input/output pins 31, 32 are shown. It will be appreciated that the device 1 may have many more than two GPIO pins.

Each peripheral 12, 14 that is able to use the GPIO has an associated pin-selection register 606, 606', the value of which determines which of the GPIO pins the respective peripheral 12, 14 can drive data to or read data from. The pins may be used by any desired peripherals, such as a UART, a PWM, etc. There is, in general, no fixed pin assignment.

The GPIO controller 30 provides a register interface 600 comprising configuration registers for configuring attributes of the GPIO pins 31, 32, including: the direction of each pin; enabling of pull-up/pull-down resistors; setting of high-level or low-level pin sensing; input buffer disconnect; and output drive strength.

The register interface 600 also includes a "PIN value" bit-field register 601 having bit positions 602. 604 that correspond to respective pin values. The register interface 600 also provides additional registers (not shown) for writing to, and reading from, a selected bit in the "PIN value" bit-field register 601, without altering the values at other bit positions in the bit-field 601. This is important in light of the security restrictions that can be placed on the "PIN value" bit-field 601, as described below.

High-level GPIO logic routes the various control and data signals between the peripherals 12, 14 and the GPIO pins. However, without the security logic described herein, it would be possible for one peripheral to "snoop" on the value of a pin driven by another peripheral. In particular, non-secure code could potentially snoop on data driven to a GPIO pin by a secure peripheral, or could launch a denial-of-service attack on secure code by flooding the secure code with interrupts generated by a GPIO pin.

This problem is overcome in the present device 1, in which the GPIO pins 31, 32 can be individually configured as secure pins or non-secure pins.

The system protection unit (SPU) 26 provides a GPIO security attribute register for configuring the security of the GPIO pins 31, 32. Each GPIO pin 31, 32 is assigned a binary security state (secure or non-secure) by a respective bit value in the GPIO security attribute register. Once the security attribute register has been configured (e.g., by secure boot code), its contents can be locked (i.e., no further writes allowed) until the device 1 is next reset, by setting a bit in an associated "lock" register.

The GPIO controller 30 is a split-security peripheral. This means that, even when the GPIO controller 30 is in a "non-secure" state, some of the words and bits in the register interface 600 of the GPIO controller 30 can be made inaccessible to non-secure bus transactions, while others register positions remain accessible to non-secure bus transactions.

In particular, if a GPIO pin 31 is declared "secure" in the SPU 26, then only peripherals 14 which have a security state of "secure" can read or change the pin. The corresponding bit position 602 in the "PIN value" bit-field register 601 is not accessible through non-secure bus requests. Non-secure peripherals 12 (including split-security peripherals 16 that aren't in a "secure" state) can't override the pin-control and data signals, and always read this secure pin 31 as zero. If a peripheral has a non-secure attribute set but one of its pin-selection registers 606 selects a secure pin 31, 32, the SPU-controlled hardware security system logic 24 will ensure that the pin selection is not propagated. Configuration registers and bit-field positions in the register interface 600 of the GPIO controller 30 that relate to a secure pin 31 are accessible only by secure accesses. Non-secure code will read a zero for any of these registers and bit-field positions. Any write requests from non-secure code to these registers and bit-field positions will have no effect.

If a GPIO pin 32 has a security state of "non-secure" then both secure and non-secure peripherals 12, 14, 16 can access the pin. Secure and non-secure code can access configuration registers and bit-field positions in the register interface 600 of the GPIO controller 30 that relate to the non-secure pin 32.

In this way, no information leakage is possible through a malicious usage of the GPIO controller 30 by some non-secure code. It also prevents malicious code from disrupting secure code execution by manipulating pins that are normally under control of secure code (for example if a pin were used to trigger an interrupt or to generate some internal event).

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. An integrated-circuit device comprising:
   a processor;
   a peripheral component;
   a bus system, connected to the processor and to the peripheral component, and configured to carry bus transactions; and
   hardware filter logic,
   wherein:
   the bus system is configured to carry security-state signals for distinguishing between secure bus transactions and non-secure bus transactions;
   the peripheral component comprises a register interface, accessible over the bus system, the register interface comprising a hardware register;
   the peripheral component comprises a direct-memory-access (DMA) controller for initiating bus transactions on the bus system; and
   the peripheral component supports a secure-in-and-non-secure-out state in which:
      based at least on the security-state signals, the hardware filter logic is configured to prevent the non-secure bus transactions from accessing the hardware register of the peripheral component, but to allow the secure bus transactions to access the peripheral component;
      the peripheral component is configured to allow an incoming secure bus transaction to access the hardware register; and
      the peripheral component is configured to initiate bus transaction bus transactions on the bus system only as non-secure bus transactions.

2. The integrated-circuit device of claim 1, wherein the hardware filter logic is configured to prevent non-secure bus transactions from reaching the peripheral component.

3. The integrated-circuit device of claim 1, wherein the hardware filter logic is configured to intercept bus transactions at one or more interception points within the bus system, each interception point being positioned within the bus system such that bus transactions from at least two master components pass the interception point, and such that bus transactions for at least two slave components pass the interception point.

4. The integrated-circuit device of claim 3, wherein the hardware filter logic is configured, for each intercepted bus transaction, to use i) a slave address of the intercepted bus transaction, and ii) a security state of the intercepted bus transaction, to determine whether to allow the intercepted bus transaction, in accordance with a set of filtering rules, and is configured to block intercepted bus transaction that are determined not to be allowed.

5. The integrated-circuit device of claim 4, wherein the filtering rules determine, for each pairing of master component and slave component, whether secure bus transactions initiated by the master component are allowed to be received by the slave component, and whether non-secure bus transactions initiated by the master component should be received by the slave component.

6. The integrated-circuit device of claim 1, wherein the peripheral component is switchable between the secure-in-and-non-secure-out state, and a non-secure state in which:
the hardware filter logic is configured to allow non-secure bus transactions to access the hardware register; and
the peripheral component is configured to initiate a bus transaction on the bus system as a non-secure bus transaction.

7. A method of operating an integrated-circuit device, wherein the integrated-circuit device comprises:
a processor;
a peripheral component; and
a bus system, connected to the processor and to the peripheral component, and configured to carry secure bus transactions and non-secure bus transactions,
wherein the bus system is configured to carry security-state signals for distinguishing between the secure bus transactions and the non-secure bus transactions;
wherein the peripheral component comprises a register interface, accessible over the bus system, the register interface comprising a hardware register,
the method comprising the peripheral component being in a secure-in-and-non-secure-out state and, while the peripheral component is in the secure-in-and-non-secure-out state:
preventing, by a hardware filter logic based at least on the security-state signals, the non-secure bus transactions from accessing the hardware register of the peripheral component, but allowing, by the hardware filter logic based at least on the security-state signals, the secure bus transactions to access the peripheral component;
allowing, by the peripheral component, an incoming secure bus transaction to access the hardware register; and
initiating, by the peripheral component, only non-secure bus transactions on the bus system.

8. An integrated-circuit device comprising:
a processor;
a peripheral component, wherein the peripheral component is a DAC (Digital-to-Analog Converter) peripheral, or a PWM (Pulse Width Modulation) peripheral, or a quadrature decoder peripheral, or a cryptographic co-processor, or a GPIO (General-Purpose Input-Output) control peripheral; and
a bus system, connected to the processor and to the peripheral component, and configured to carry bus transactions,
wherein:
the peripheral component comprises a register interface, accessible over the bus system, the register interface comprising a first hardware register and a second hardware register;

the bus system is configured to carry security-state signals for distinguishing between secure bus transactions and non-secure bus transactions;
the peripheral component comprises an input for receiving the security-state signals from the bus system; and
the peripheral component supports a split-security state in which the peripheral component, based at least on the security-state signals, is configured to:
prevent a non-secure bus transaction from accessing the first hardware register;
allow a secure bus transaction to access the first hardware register; and
allow a non-secure bus transaction to access the second hardware register.

9. The integrated-circuit device of claim 8, wherein the peripheral component is configured to use a security state of an incoming bus transaction, and an address of the incoming bus transaction, to determine whether to allow or prevent the incoming bus transaction from accessing a hardware register of the peripheral component at said address.

10. The integrated-circuit device of claim 8, wherein, when the peripheral component is in the split-security state, the peripheral component is configured to allow secure bus transactions to access the second hardware register.

11. The integrated-circuit device of claim 8, wherein the peripheral component is switchable between the split-security state and a secure state, and wherein, when the peripheral component is in the secure state, the device is configured to prevent non-secure bus transactions from reaching the peripheral component.

12. The integrated-circuit device of claim 11, wherein the integrated-circuit device comprises a system protection unit that provides a register interface for controlling a state of the peripheral component.

13. The integrated-circuit device of claim 11, wherein the integrated-circuit device comprises an integral direct-memory-access (DMA) controller for initiating bus transactions on the bus system, wherein the DMA controller is configured to output security-state signals onto the bus system, wherein the peripheral component is configured to initiate non-secure bus transactions when the peripheral component is in the split-security state, and wherein the peripheral component is switchable, when in the split-security state, between initiating secure bus transactions and initiating non-secure bus transactions.

14. A method of operating an integrated-circuit device, wherein the integrated-circuit device comprises:
a processor;
a peripheral component, wherein the peripheral component is a DAC (Digital-to-Analog Converter) peripheral, or a PWM (Pulse Width Modulation) peripheral, or a quadrature decoder peripheral, or a cryptographic co-processor, or a GPIO (General-Purpose Input-Output) control peripheral; and
a bus system, connected to the processor and to the peripheral component, and configured to carry secure bus transactions and non-secure bus transactions,
wherein the peripheral component comprises a register interface, accessible over the bus system, the register interface comprising a first hardware register and a second hardware register,
wherein the bus system is configured to carry security-state signals for distinguishing between the secure bus transactions and the non-secure bus transactions;
the peripheral component comprises an input for receiving the security-state signals from the bus system;
the method comprising:

receiving, by the peripheral component, the secure bus transactions and the non-secure bus transactions from the bus system; and while the peripheral component is in a split-security state, based at least on the security-state signals:
- preventing, by the peripheral component, a non-secure bus transaction from accessing the first hardware register;
- allowing, by the peripheral component, a secure bus transaction to access the first hardware register; and
- allowing, by the peripheral component, a non-secure bus transaction to access the second hardware register.

\* \* \* \* \*

UNITED STATES PATENT AND TRADEMARK OFFICE
CERTIFICATE OF CORRECTION

PATENT NO. : 11,698,995 B2
APPLICATION NO. : 17/255876
DATED : July 11, 2023
INVENTOR(S) : Barzic et al.

Page 1 of 1

It is certified that error appears in the above-identified patent and that said Letters Patent is hereby corrected as shown below:

In the Claims

<u>Column 19,</u>
Line 5, "bus transaction that are" should be --bus transactions that are--

Signed and Sealed this
Twenty-first Day of January, 2025

Coke Morgan Stewart
*Acting Director of the United States Patent and Trademark Office*